(12) United States Patent
Shimizu et al.

(10) Patent No.: US 10,003,055 B2
(45) Date of Patent: Jun. 19, 2018

(54) BATTERY MODULE

(71) Applicant: Panasonic Intellectual Property Management Co., Ltd., Osaka (JP)

(72) Inventors: Keisuke Shimizu, Osaka (JP); Yoshihiro Shiotsu, Osaka (JP); Hiroshi Takasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 74 days.

(21) Appl. No.: 14/912,370

(22) PCT Filed: Oct. 29, 2014

(86) PCT No.: PCT/JP2014/005472
§ 371 (c)(1),
(2) Date: Feb. 16, 2016

(87) PCT Pub. No.: WO2015/064096
PCT Pub. Date: May 7, 2015

(65) Prior Publication Data
US 2016/0204404 A1     Jul. 14, 2016

(30) Foreign Application Priority Data

Oct. 31, 2013    (JP) .................................. 2013-227050

(51) Int. Cl.
*H01M 2/12* (2006.01)
*H01M 2/10* (2006.01)

(52) U.S. Cl.
CPC ....... *H01M 2/1235* (2013.01); *H01M 2/1077* (2013.01); *H01M 2/1264* (2013.01)

(58) Field of Classification Search
CPC . H01M 2/1077; H01M 2/1235; H01M 2/1264
See application file for complete search history.

(56) References Cited

U.S. PATENT DOCUMENTS

| | | | |
|---|---|---|---|
| 2002/0150814 A1* | 10/2002 | Causton | H01M 2/025 |
| | | | 429/82 |
| 2003/0096161 A1 | 5/2003 | Watanabe et al. | |
| 2006/0141353 A1 | 6/2006 | Watanabe et al. | |

(Continued)

FOREIGN PATENT DOCUMENTS

| | | |
|---|---|---|
| JP | 64-054251 U | 4/1989 |
| JP | 2003-157813 | 5/2003 |
| JP | 2003-272588 | 9/2003 |

(Continued)

OTHER PUBLICATIONS

International Search Report of PCT application No. PCT/JP2014/005472 dated Jan. 20, 2015.

*Primary Examiner* — Miriam Stagg
*Assistant Examiner* — Victoria H Lynch
(74) *Attorney, Agent, or Firm* — McDermott Will & Emery LLP

(57) ABSTRACT

A battery module includes: a plurality of battery cells and a case for housing the plurality of battery cells. The case has a plurality of through-holes which are provided to a wall part forming an outer face of the battery module and via which gas ejected from at least one of the plurality of battery cells is discharged in a dispersed manner.

4 Claims, 12 Drawing Sheets

(56) References Cited

U.S. PATENT DOCUMENTS

2012/0164490 A1* 6/2012 Itoi ................. H01M 2/105
429/7
2013/0337307 A1* 12/2013 Butterfield ............ H01M 2/10
429/99

FOREIGN PATENT DOCUMENTS

| | | |
|---|---|---|
| JP | 2005-123069 | 5/2005 |
| JP | 2008-311016 | 12/2008 |
| JP | 2012-015121 | 1/2012 |
| JP | 2012-252946 | 12/2012 |

* cited by examiner

BATTERY MODULE

CROSS-REFERENCE TO RELATED APPLICATIONS

This application is a U.S. national stage application of the PCT International Application No. PCT/JP2014/005472 filed on Oct. 29, 2014, which claims the benefit of foreign priority of Japanese patent application 2013-227050 filed on Oct. 31, 2013, the contents all of which are incorporated herein by reference.

TECHNICAL FIELD

The present disclosure relates to a battery module including a case for housing a plurality of battery cells.

BACKGROUND ART

Described in Patent Literature 1 is a battery module including two battery cells and an insulating spacer connected between the two battery cells. A plurality of through-holes radially passing thorough the insulating spacer are formed and gas in the battery cells is discharged outside the insulating spacer via the through-holes.

Disclosed in Patent Literature 2 is a battery pack including a battery module formed by layering a plurality of battery cells and an intake chamber and an exhaust chamber respectively disposed along opposite faces of the battery module. A plurality of through-holes are formed in a side face of the exhaust chamber to allow air around the battery module to flow into the exhaust chamber.

CITATION LIST

Patent Literature

PTL 1: Unexamined Japanese Patent Publication No. 2005-123069
PTL 2: Unexamined Japanese Patent Publication No. 2008-311016

SUMMARY OF THE INVENTION

Structures respectively described in Patent Literatures 1, 2 are susceptible to improvement in reduction of a temperature of gas ejected from the battery cells and discharged outside the case in the structure including the case for housing the plurality of battery cells.

According to an aspect of the present disclosure, there is provided a battery module including a plurality of battery cells and a case for housing the plurality of battery cells. The case has a plurality of through-holes which are provided in a wall part forming an outer face of the battery module and via which gas ejected from at least one of the plurality of battery cells is discharged in a dispersed manner.

With the battery module according to the aspect of the present disclosure, it is possible to reduce a temperature of the gas discharged outside the case from the battery cells in a structure including the case for housing the plurality of battery cells.

DESCRIPTION OF EMBODIMENT

An exemplary embodiment according to the present disclosure will be described below in detail with reference to the drawings. In the description, specific shapes, materials, values, directions, and the like are examples for ease of understanding of the present disclosure and can be changed suitably according to uses, purposes, specifications, and the like. If a plurality of exemplary embodiments or modifications are included in the following description, the present invention can be carried out by suitably or arbitrarily combining respective component elements in the plurality of exemplary embodiments or modifications. In the following description, substantially the same elements may be provided with the same reference marks in all the drawings and described in some cases.

Figure 1:
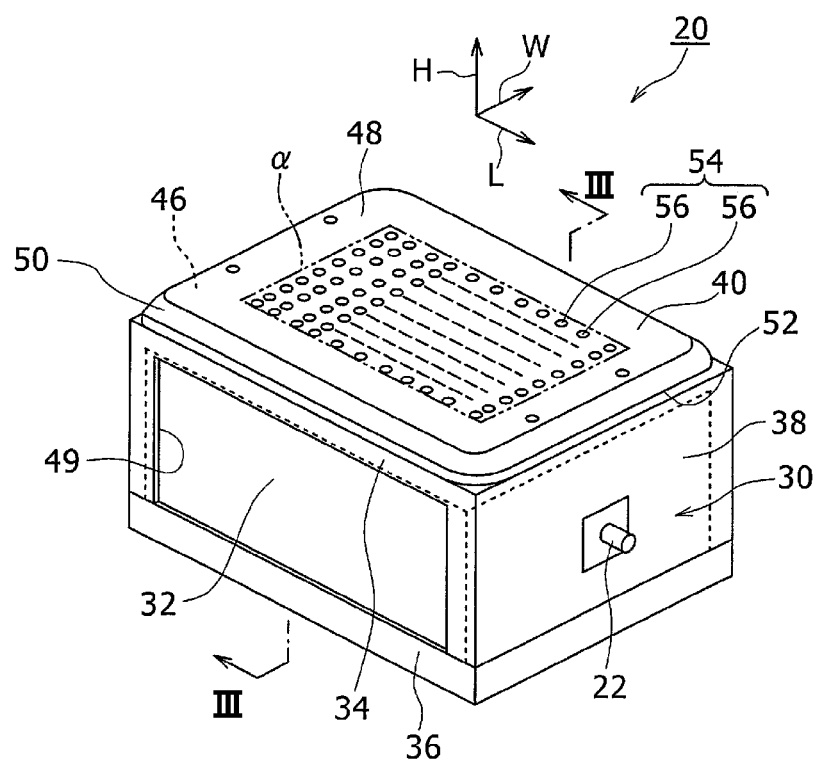
FIG. 1 is a perspective view of a battery module in an exemplary embodiment of the present disclosure.
Figure 2:
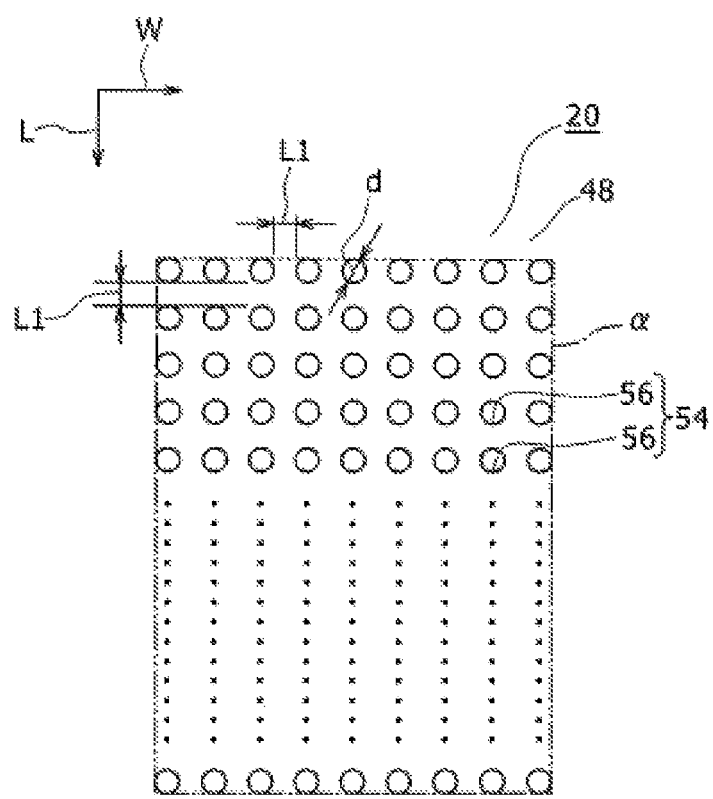
FIG. 2 is a top view of a through-hole dispersed part in FIG. 1.
Figure 3:
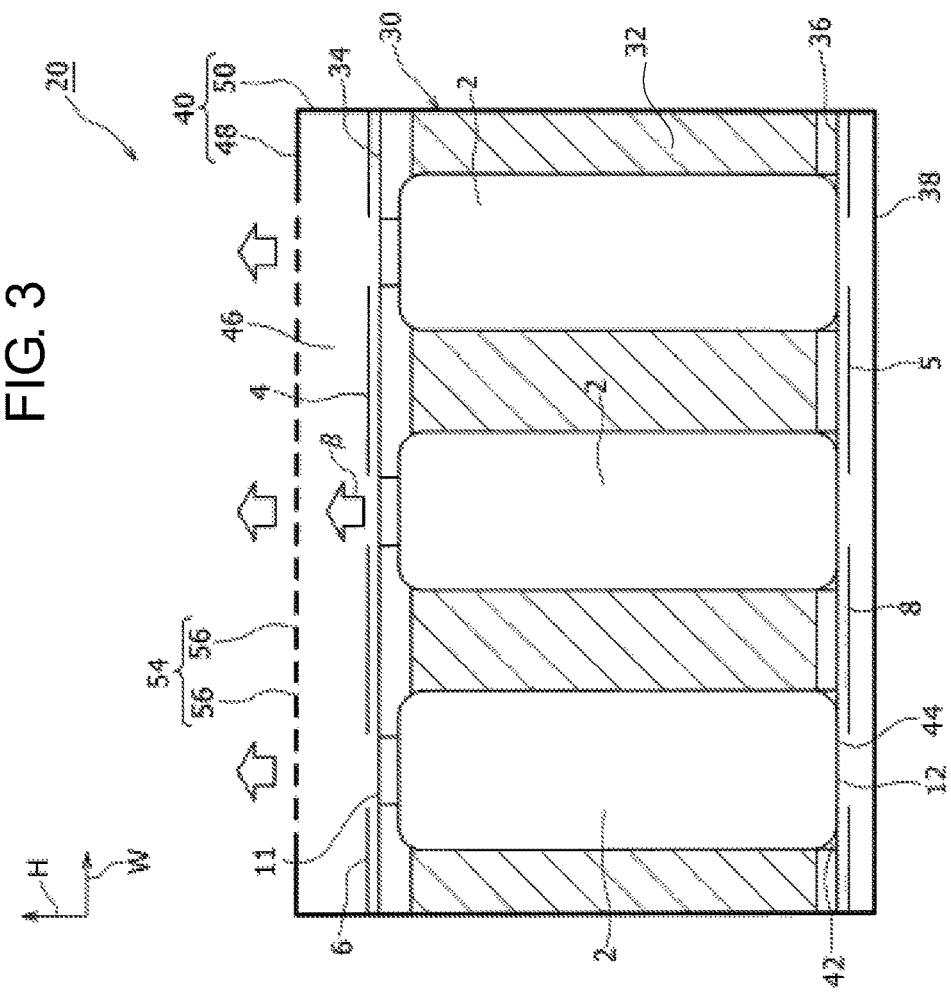
FIG. 3 is a sectional view taken along line III-III FIG. 1.

FIG. 1 is a perspective view of battery module 20 in the exemplary embodiment. FIG. 2 is a top view of through-hole dispersed part 54 in FIG. 1. FIG. 3 is a sectional view taken along line III-III in FIG. 1. Battery module 20 is used as an electric storage device for an electric device in a vehicle or a building. Battery module 20 may be charged with electric power obtained by a power generation unit such as a solar cell (not shown) and the electric power may be taken out as necessary and supplied to the electric device.

In FIGS. 1 to 3 and part of the drawings described later, height direction H, length direction L, and width direction W are shown as directions of three axes orthogonal to each other. Height direction H is an up-down direction or a vertical direction when battery module 20 is disposed on a horizontal plane. Length direction L and width direction W are directions orthogonal to each other in the horizontal plane. Here, the direction in which battery module 20 has a longer dimension is defined as length direction L and the direction in which battery module 20 has a shorter dimension is defined as width direction W.

Battery module 20 is formed in a rectangular parallelepiped shape. Terminal parts 22 are formed to protrude from opposite end parts in length direction L of battery module 20. One of two terminal parts 22 is a positive terminal and the other is a negative terminal. Terminal parts 22 are electrically connected to electrodes of battery cells 2 which are smallest units included in battery module 20 and serve as input/output terminals when battery cells 2 are charged and discharged. Two terminal parts 22 may be concentrated on a single terminal unit provided to one side end part in length direction L of battery module 20.

Battery module 20 includes a plurality of battery cells 2 arranged in a staggered (zigzag) arrangement and module case 30 for housing the plurality of battery cells 2. Battery module 20 is formed by connecting the plurality of battery cells 2 in parallel so as to obtain a predetermined battery capacity.

As shown in FIG. 3, the plurality of battery cells 2 of battery module 20 are disposed in predetermined arrangement relationships with all of positive sides positioned on one side and all of negative sides positioned on the other side. Module case 30 includes battery cell case 32, upper holder 34, lower holder 36, cover member 38, and duct member 40. Battery cell case 32 houses and holds the plurality of battery cells 2 in the predetermined arrangement relationships, positive-side current collector 4 is disposed on a positive side, and negative-side current collector 5 is disposed on a negative side. On the positive side and the negative side of battery cell case 32, positive-side current collector 4 and negative-side current collector 5 are disposed, respectively. Battery cell case 32 is connected by suitable fastening members while disposed between upper holder 34 and lower holder 36 which are two holders and with positive-side current collector 4 and negative-side current collector 5 disposed on the opposite sides of battery cell case 32. For example, upper holder 34 and lower holder 36 are connected at opposite end parts in length direction L. Lower holder 36 supports lower end parts of respective battery cells 2 upward.

Battery cells 2 are secondary batteries which are the smallest battery units forming battery module 20 and which can be charged and discharged. As the secondary batteries, lithium ion batteries are used. Besides the lithium ion batteries, nickel-metal hydride batteries, alkaline batteries, or the like may be used. The plurality of battery cells 2 included in battery module 20 are arranged in the staggered (zigzag) arrangement with minimal clearances between adjacent battery cells 2. Five rows of batteries are arranged in width direction W, respective battery rows include alternately different numbers of (e.g., seven, six, seven, six, and seven) battery cells 2 along length direction L. The arrangement of the plurality of battery cells 2 is not limited to the staggered arrangement. The plurality of battery cells 2 may be arranged along width direction W and length direction L, respectively.

Each of battery cells 2 is formed by putting a spirally wound electrode body in an exterior can having a circular cylindrical outer shape and sealing the exterior can with a sealing plate. One of opposite end parts of the circular cylindrical shape is used as positive electrode 11 and the other is used as negative electrode 12. In the exemplary embodiment, positive electrode 11 is provided to the upper end of each of battery cells 2 shown in FIG. 3 and negative electrode 12 is provided to the lower end. Battery cells 2 are not limited to the batteries having the circular cylindrical outer shapes. Battery cells 2 may be batteries having other outer shapes, e.g., prismatic batteries.

Each of battery cells 2 has a safety valve (not shown) on a side of positive electrode 11. The safety valve has a function of releasing gas outside the cell from an inside of the battery as exhaust gas when a pressure of the gas generated by electrochemical reactions occurring in battery cell 2 exceeds a predetermined threshold pressure. The safety valve may include a metal sheet which ruptures when the gas pressure exceeds the threshold pressure or a valve element which separates from a valve seat when the gas pressure exceeds the threshold pressure.

Battery cell case 32 is a frame body having the same height as battery cells 2 and provided with battery housings which are in shapes of through-holes open on opposite end sides in height direction H and the same as battery cells 2 in number. Each of battery cells 2 is housed and disposed in one of the battery housings.

The battery housings are arranged in a staggered arrangement in conformity with the arrangement of battery cells 2. As this battery cell case 32, a case obtained by forming resin or metal into a predetermined shape may be used, for example.

Positive-side current collector 4 is a connecting member disposed on one side of battery cell case 32 to electrically connect the respective positive sides of arranged battery cells 2. Positive-side current collector 4 is formed by a positive-side insulating plate and a positive plate (not shown) and positive lead plate 6.

The positive-side insulating plate is a plate member disposed between battery cell case 32, and the positive plate and positive lead plate 6 to provide electric insulation between battery cell case 32, the positive plate, and positive lead plate 6. The positive-side insulating plate is provided with openings through which positive electrodes 11 of battery cells 2 protrude, which are the same as battery cells 2 in number, and which have circular shapes or the like. As this positive-side insulating plate, a resin molded article or a resin sheet (formed into a predetermined shape) with predetermined heat resistance and a predetermined electrical insulation property is used.

The positive plate is a thin sheet having electrode contact parts which are respectively disposed in such positions as to individually come in contact with positive electrodes 11 of battery cells 2 and are the same as battery cells 2 in number. As this positive plate, a thin metal plate which has electrical conductivity and on which the electrode contact parts in predetermined shapes with substantially C-shaped cut-away parts formed around the electrode contact parts are formed by etching or press working can be used.

Positive lead plate 6 is an electrode plate electrically connected to the positive plate to connect the electrode contact parts which are the same as battery cells 2 in number to form at least one positive-side output terminal. As this positive lead plate 6, a thin metal plate having electrical conductivity and suitable thickness and strength may be used. As positive lead plate 6, a thin metal plate on which electrode contact parts in predetermined shapes and having openings in circular shapes or the like are formed by etching or press working can be used. Positive lead plate 6 is connected to terminal part 22 on the one side.

Negative-side current collector 5 is a connecting member disposed at an opening on the other side of battery cell case 32 to electrically connect respective negative sides of arranged battery cells 2. Negative-side current collector 5 is formed by a negative-side insulating plate and a negative plate (not shown) and negative lead plate 8.

The negative-side insulating plate is a plate member disposed between battery cell case 32, and the negative plate and negative lead plate 8 to provide electric insulation between battery cell case 32, the negative plate, and negative lead plate 8. The negative-side insulating plate is provided with openings through which negative electrodes 12 of battery cells 2 are exposed, which are the same as battery cells 2 in number, and which have circular shapes or the like. As this negative-side insulating plate, a resin molded article or a resin sheet (formed into a predetermined shape) with predetermined heat resistance and a predetermined electrical insulation property is used.

The negative plate is an electrode member having electrode contact parts which are respectively disposed in such positions as to individually come in contact with the negative electrodes of battery cells 2 and are the same as battery cells 2 in number. As this negative plate, a thin metal plate which has electrical conductivity and on which the electrode contact parts are defined by forming substantially C-shaped cut-away parts by etching or press working may be used. Each of the electrode contact parts of the negative plate may be provided with a current interruption device which melts when a temperature exceeds a predetermined threshold temperature due to passage of an overcurrent through battery cell 2.

Negative lead plate 8 is an electrode plate electrically connected to the negative plate to connect the electrode contact parts which are the same as battery cells 2 in number to form at least one negative-side output terminal. As this negative lead plate 8, a thin metal plate which has electrical conductivity, and has suitable thickness and strength, and on which openings in circular shapes or the like are formed by etching or press working in conformity with the electrode contact parts of the negative plate may be used. Negative lead plate 8 is connected to terminal part 22 on the other side.

Respective holders 34, 36 are disposed inside cover member 38. Cover member 38 is formed by connecting upper and lower two separate cover elements with fastening members at opposite ends in length direction L, for example. In this state, positive-side current collector 4 is disposed between upper holder 34 and the upper cover element and negative-side current collector 5 is disposed between lower holder 36 and the lower cover element. In this way, battery cell case 32, positive-side current collector 4, negative-side current collector 5, holders 34, 36, and cover member 38 are integrated as a whole. In this state, positional relationships of the battery housings of battery cell case 32 with the respective electrode contact parts of respective current collectors 4, 5 are restricted to predetermined relationships. Cover member 38 and holders 34, 36 are respectively made of insulating material, e.g., resin.

Figure 8:
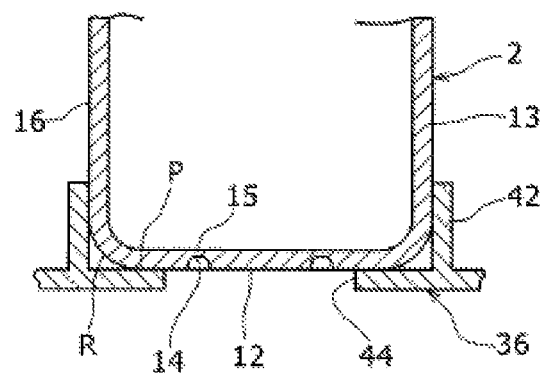
FIG. 8 is an enlarged sectional view of part B of an exterior can forming a battery cell in FIG. 7.

With reference to FIG. 8 for explaining a variation described later, lower holder 36 includes a plurality of cylindrical holding parts 42 for holding respective battery cells 2 upward. In each of holding parts 42, a lower end part of each of battery cells 2 is fitted and supported by press fitting, for example. Lower opening 44 is formed inside each of holding parts 42 of lower holder 36. Each of electrode contact parts provided to the negative plate comes in contact with negative electrode 12 of battery cell 2 through lower opening 44.

The holders may not be formed separately. For example, a side part for covering side faces of battery cell case 32, an upper part for covering a positive side, and a lower part for covering a negative side may be formed integrally.

Returning to FIG. 1, duct member 40 having gas diffusion chamber 46 in itself and a U-shaped section which is open on a lower side is provided to an upper part of battery module 20. Duct member 40 includes plate part 48 at an upper end and peripheral wall part 50 connected to a lower side of an outer peripheral part of plate part 48 throughout an entire length of plate part 48. Plate part 48 is an upper wall part forming an outer face of battery module 20.

Duct member 40 is provided to cover an upper side of upper holder 34 and fixed to an upper side of an opening peripheral edge part of first frame part 52 provided to an upper end part of cover member 38. The outer face of battery module 20 is formed by duct member 40, cover member 38, upper holder 34, lower holder 36, and side faces of battery cell case 32 exposed to an outside. Battery cell case 32 is exposed to the outside at opposite ends in width direction W of battery module 20 from inside second frame part 49 formed by upper holder 34 and lower holder 36.

As shown in FIG. 3, gas diffusion chamber 46 faces positive electrodes 11 of battery cells 2 with the opening parts or the cut-away parts and the safety valves interposed between gas diffusion chamber 46 and positive electrodes 11. Duct member 40 includes through-hole dispersed part 54 formed in plate part 48.

Through-hole dispersed part 54 includes circular fine holes 56 which are a plurality of through-holes arranged to be aligned along length direction L and width direction W in a rectangular part surrounded with a two-dot chain line α in FIGS. 1, 2. Each of fine holes 56 vertically passes through plate part 48. Gas diffusion chamber 46 is provided on a side of battery cells 2 of plate part 48 and communicates with an outer space through fine holes 56.

The plurality of fine holes 56 are preferably arranged at equal intervals along length direction L and width direction W, respectively, of the plate part. For example, if an interval between fine holes 56 adjacent to each other along length direction L is L1, an interval between fine holes 56 adjacent to each other along width direction W is also L1. The plurality of fine holes 56 are not limited to the structure in which fine holes 56 are disposed at equal intervals and intervals between the plurality of fine holes 56 along length direction L and width direction W may be different from each other.

The plurality of fine holes 56 exhaust gas ejected from at least one battery cell 2 of the plurality of battery cells 2 to the outside of battery module 20 in a dispersed manner via the plurality of fine holes 56. In this way, the gas ejected from the safety valve of battery cell 2 can be discharged outside from gas diffusion chamber 46 via fine holes 56. It suffices if duct member 40 is made of material with high heat conductivity. For example, duct member 40 is formed by a metal plate mainly made of aluminum.

Although a case in which respective battery cells 2 are connected in parallel as battery module 20 has been described above, a plurality of battery cells may be formed by connecting a plurality of groups of battery cells (which are connected in parallel) in series.

If voltage of one battery cell 2 is 4.2 V, a total area of respective opening areas of the plurality of fine holes 56 facing the outer space is preferably 160 mm$^2$ or larger. By restricting the total area of the respective opening areas in this manner, it is possible to remarkably suppress increase in pressure in gas diffusion chamber 46. Moreover, diameter d of each of fine holes 56 is preferably 2 mm or smaller and more preferably 1.2 mm or smaller and interval L1 between adjacent fine holes 56 is preferably 5 mm or longer. By restricting diameter d of each of fine holes 56 and interval L1 between adjacent fine holes 56 in this manner, it is possible to obtain a remarkable effect on suppression of a temperature of the gas ejected from battery cells 2 and discharged via fine holes 56.

According to battery module 20 described above, the high-temperature gas ejected in a direction of arrow β in FIG. 3 from the positive side of at least one battery cell 2 is diffused in gas diffusion chamber 46 and discharged outside battery module 20 in the dispersed manner via the plurality of fine holes 56. In this way, much air is likely to come in contact with a small amount of gas discharged from each fine hole 56, which efficiently cools the gas. Moreover, an adiabatic expansion effect exerted when the gas passes through fine hole 56 also cools the gas. Therefore, in the structure including module case 30 for housing the plurality of battery cells 2, it is possible to reduce the temperature of the gas discharged outside module case 30 from battery cells 2. As a result, it is possible to prevent the gas discharged outside battery module 20 from harming the vehicle or the electric device mounted with battery module 20.

Furthermore, because fine holes 56 are formed in plate part 48 which is a wall part forming an outer face of module case 30, it is unnecessary to couple a long duct which is a separate member from module case 30 in order to reduce the temperature of the gas ejected from battery cells 2 in battery module 20. Therefore, it is possible to prevent increase in size of the structure in which battery module 20 is provided with the cooling means for the discharged gas. Although respective fine holes 56 are in circular shapes, shapes of fine holes 56 are not limited to the circular shapes and may be oval or rectangular shapes, for example.

Figure 4:
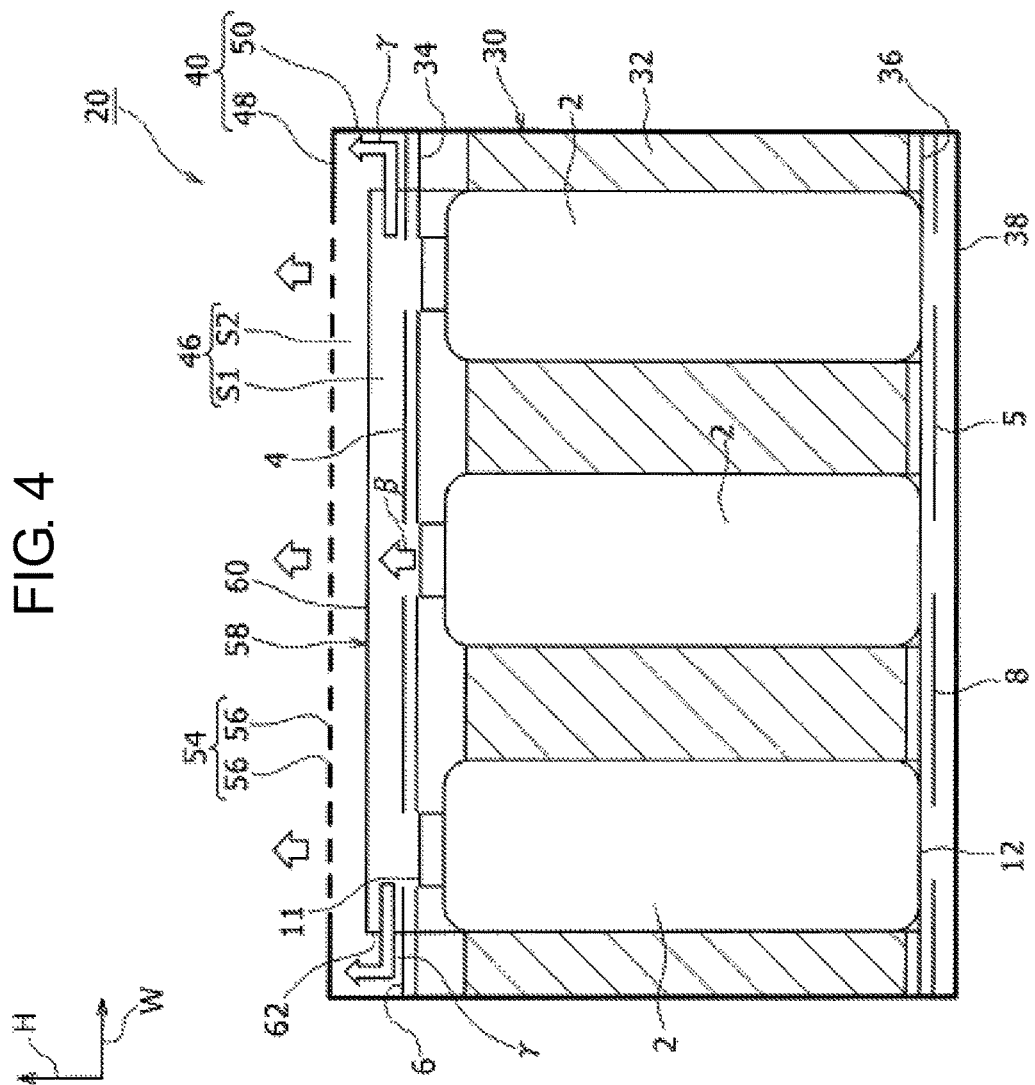
FIG. 4 is a diagram showing a first example of a variation of the battery module in the exemplary embodiment of the present disclosure and corresponding to FIG. 3.
Figure 5:
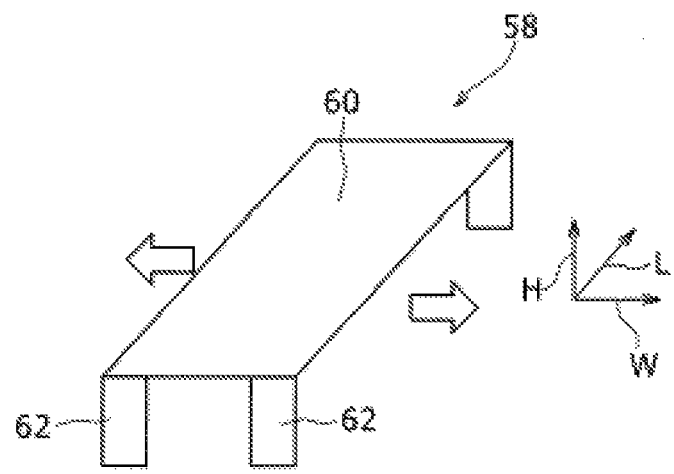
FIG. 5 is a perspective view of a gas intercepting member from a structure in FIG. 4.

FIG. 4 is a diagram showing a first example of the variation of battery module 20 in the exemplary embodiment and corresponding to FIG. 3. Battery module 20 in this example includes gas intercepting member 58 provided in gas diffusion chamber 46 inside duct member 40. As shown in FIG. 5, gas intercepting member 58 is formed in a table shape by connecting a plurality of (e.g., four) pillar-shaped leg parts 62 to a lower side of gas intercepting plate 60 in a shape of a flat plate. Gas intercepting member 58 is made of material such as metal having heat resistance.

Returning to FIG. 4, lower ends of respective leg parts 62 are fixed to upper end part of battery cell case 32 or cover member 38. In this state, gas intercepting plate 60 is disposed between positive electrodes 11 of the plurality of battery cells 2 and the plurality of fine holes 56 and gas intercepting plate 60 faces upper parts of positive electrodes 11 of respective battery cells 2 with the safety valves interposed between positive electrodes 11 and gas intercepting plate 60. Gas diffusion chamber 46 is partitioned with gas intercepting plate 60 into battery cell side space S1 and fine hole side space S2 and battery cell side space S1 and fine hole side space S2 communicate with each other near an outer periphery of gas intercepting plate 60 through between adjacent leg parts 62.

According to the above-described structure, the high-temperature gas ejected in the direction of arrow β in FIG. 4 from the positive sides of battery cells 2 collides with gas intercepting plate 60 and then flows near the outer periphery of gas intercepting plate 60 in directions of arrows γ from battery cell side space S1 which is a clearance between gas intercepting plate 60 and positive lead plate 6, and passes through fine hole side space S2, and is discharged outside battery module 20 via fine holes 56. Therefore, a gas discharge path through which the gas is discharged outside battery module 20 from battery cells 2 is long and it is possible to more efficiently reduce the temperature of the gas. Other structures and operations are similar to those of the structure in FIGS. 1 to 3.

Figure 6:
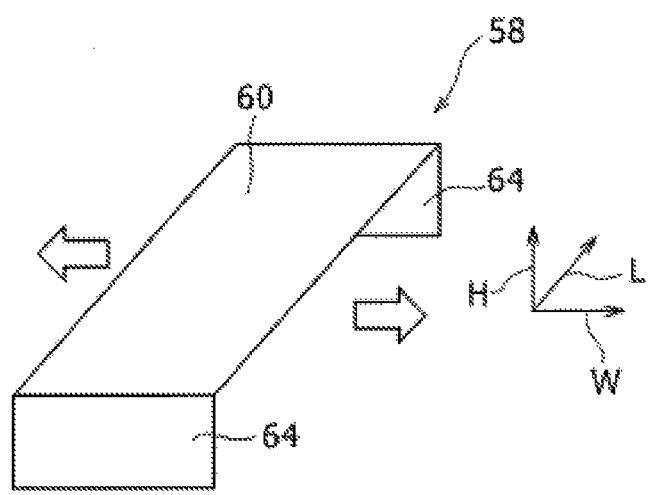
FIG. 6 is a perspective view of a variation of the gas intercepting member.

A number of leg parts 62 of gas intercepting member 58 is not limited to four and a suitable number of (e.g., 6, 8) leg parts 62 may be provided. As in a variation of gas intercepting member 58 shown in FIG. 6, second plate parts 64 may be perpendicularly connected to lower sides of opposite end parts in length direction L or width direction W of gas intercepting plate 60 so that gas is sent from battery cell side space 51 to fine hole side space S2 through between second plate parts 64.

Figure 7:
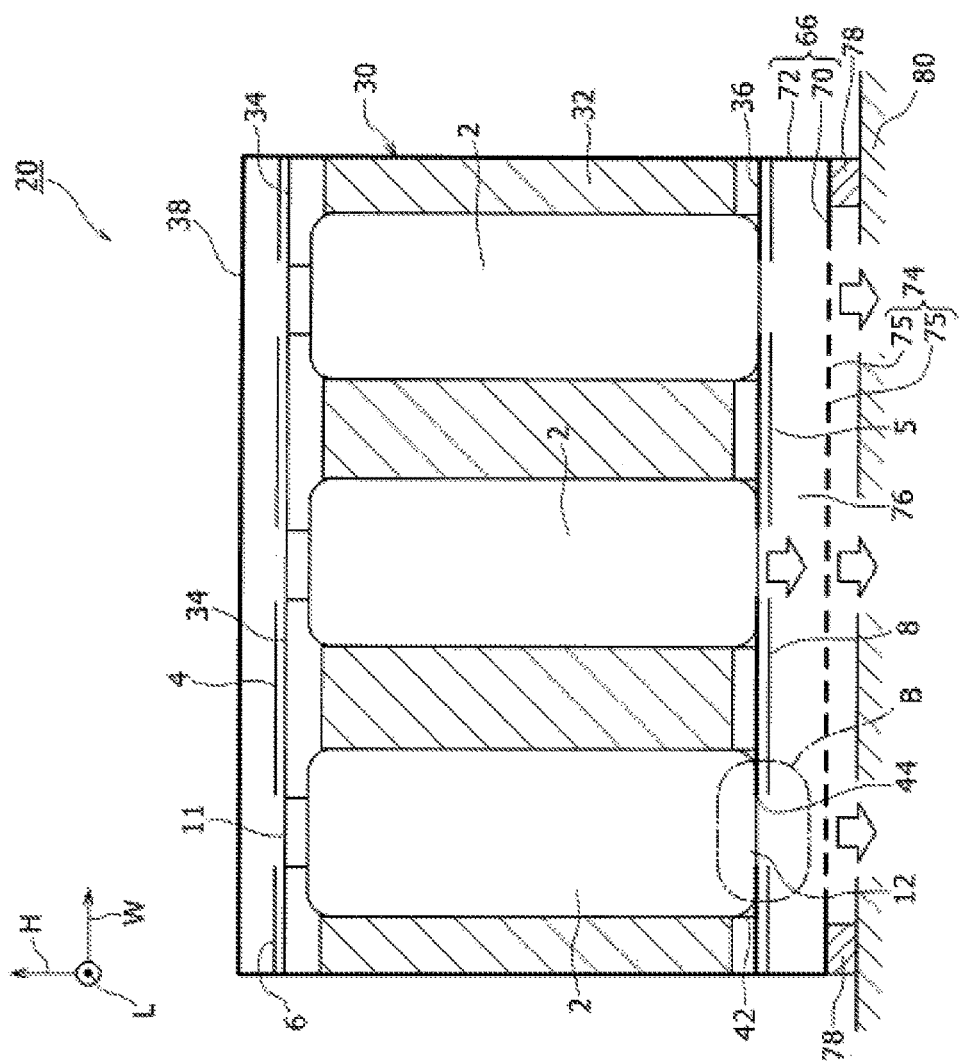
FIG. 7 is a diagram showing a second example of the variation of the battery module in the exemplary embodiment of the present disclosure and corresponding to FIG. 3.

FIG. 7 is a diagram showing a second example of the variation of battery module 20 in the exemplary embodiment and corresponding to FIG. 3. Battery module 20 in this example allows gas ejected from battery cells 2 to an outside of battery module 20 not from positive sides but from negative sides of battery cells 2.

To put it concretely, a duct member is not provided to an upper portion of module case 30, and module case 30 includes cover member 38 for closing an upper end of battery module 20, battery cell case 32, upper holder 34, lower holder 36, and lower duct member 66. Cover member 38 includes a frame part near an outer peripheral part of battery module 20 at a lower end part. Lower duct member 66 is connected to close a lower side of an opening end of the frame part. Lower duct member 66 includes lower plate part 70 which is a lower wall part and lower peripheral wall part 72 connected to an entire outer peripheral part of lower plate part 70. This module case 30 is similar to a vertically inverted structure of module case 30 in FIGS. 1 to 3. Lower holder 36 has circular lower openings 44 which are the same as battery cells 2 in number at portions facing negative electrodes 12 of respective battery cells 2 on inner sides of respective holding parts 42.

Figure 9:
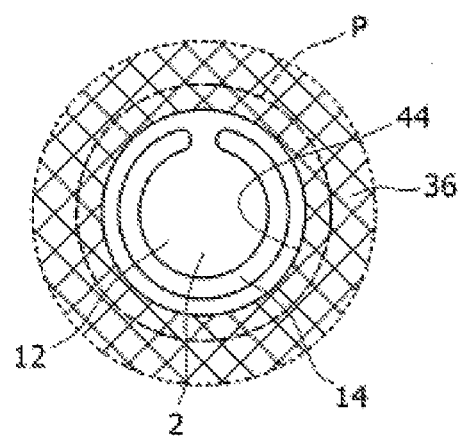
FIG. 9 is a bottom view of FIG. 8.

FIG. 8 is an enlarged sectional view of part B of exterior can 13 forming battery cell 2 in FIG. 7. FIG. 9 is a bottom view of FIG. 8. As shown in FIGS. 8, 9, C-shaped thin-walled part 15 is formed at a lower portion of each battery cell 2 by forming C-shaped engraved part 14 at a lower end face of exterior can 13.

Figure 11:
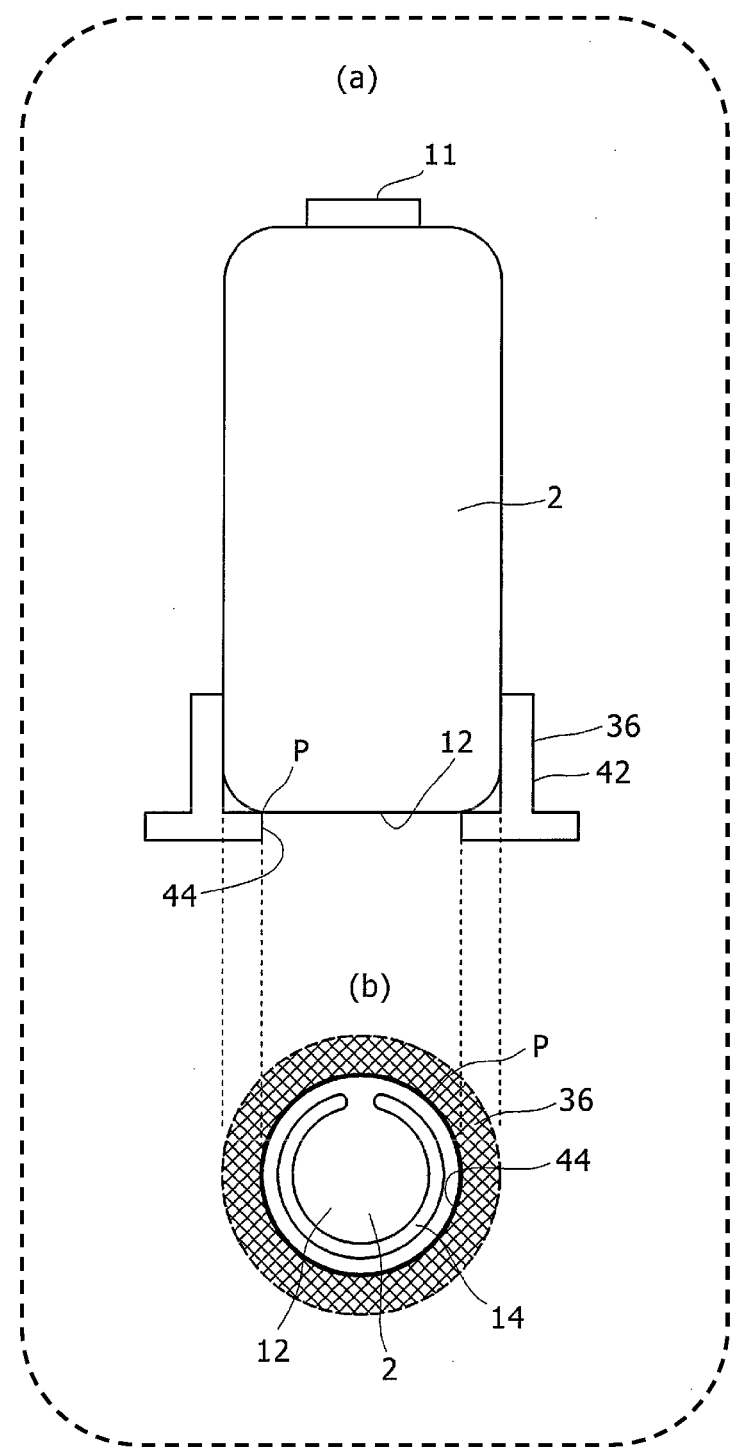
FIG. 11 is a view of one of the single battery cells and a lower holder in a structure in FIG. 10, and the section (a) of FIG. 11 is an enlarged view of those, and the section (b) of FIG. 11 is a bottom view of the section (a) of FIG. 11.
Figure 12:
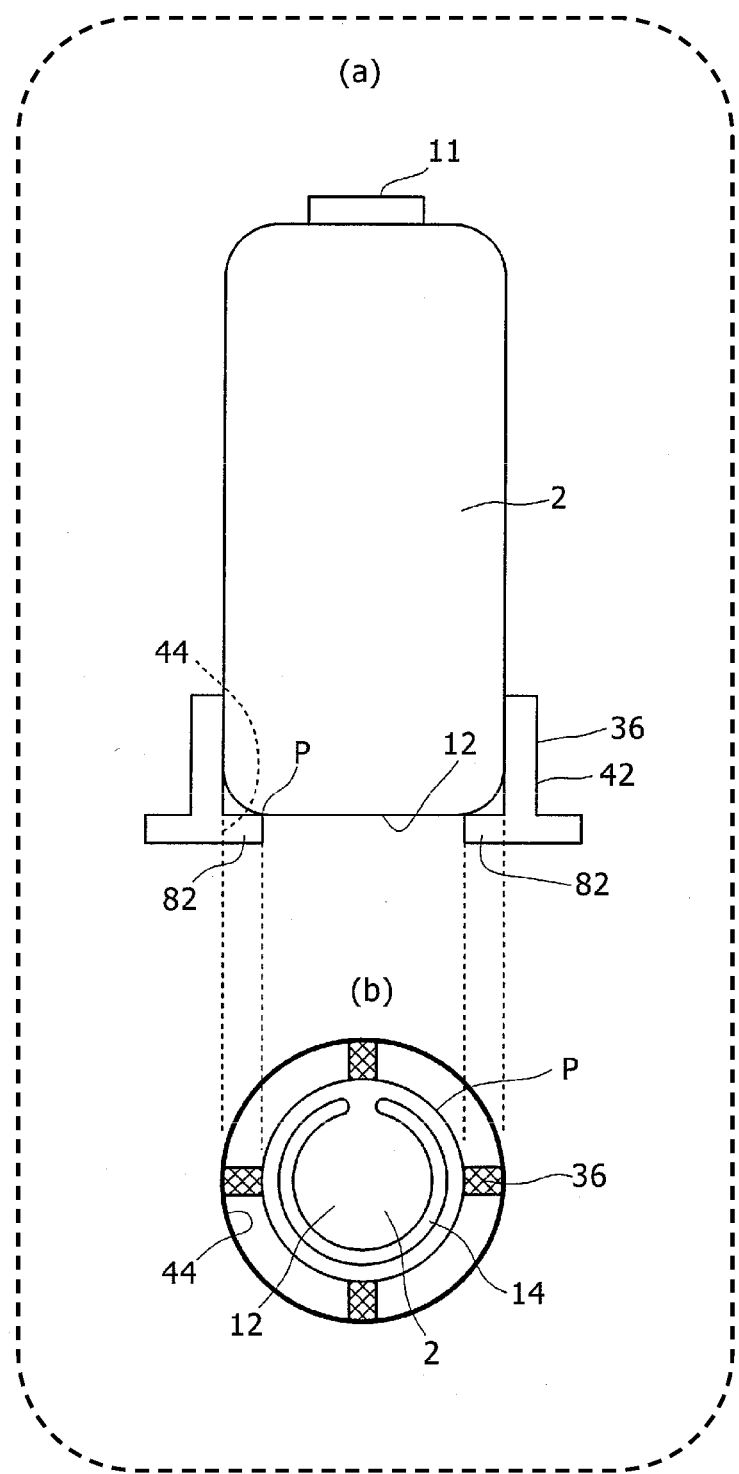
FIG. 12 is a view show a variation of the lower holder; the section (a) of FIG. 12 is a diagram corresponding to the section (a) of FIG. 11 and the section (b) of FIG. 12 is a bottom view of the section (a) of FIG. 12.

An upper end peripheral edge part of each of lower openings 44 of lower holder 36 comes in contact with corner part P (a boundary between a curved face part R having an arc-shaped section and a lower face) of a lower end outer peripheral edge part of battery cell 2, and a part on a radially inner side of corner portion P on a radially outer side of engraved part 14 on a lower end face of battery cell 2. FIG. 9 and FIGS. 11, 12 (described later) show a vertical overlap part between the lower end face of battery cell 2 and lower holder 36 when battery cell 2 is seen from below as a diagonally hatched part.

As shown in FIG. 7, lower through-hole dispersed part 74 is formed at lower plate part 70 of lower duct member 66. Lower through-hole dispersed part 74 includes fine holes 75 which are a plurality of through-holes similarly to through-hole dispersed part 54 formed at duct member 40 in the structure in FIG. 1. Each of fine holes 75 vertically passes through lower plate part 70. Lower gas diffusion chamber 76 is formed between lower plate part 70 and negative lead plate 8. Lower gas diffusion chamber 76 faces lower ends of the plurality of battery cells 2. Lower leg parts 78 which are long in length direction L are connected to opposite end parts in width direction W of a lower face of lower duct member 66. Battery module 20 is installed onto a horizontal face of fixing member 80 with lower leg parts 78 interposed between battery module 20 and the horizontal face.

With the above-described structure, when pressure in each of battery cells 2 increases, thin-walled part 15 of a lower end part of battery cell 2 ruptures to push an inner part of thin-walled part 15 downward, gas is ejected from a negative side of battery cell 2, and the gas is diffused into lower gas diffusion chamber 76 via lower opening 44 of lower holder 36. The gas diffused in lower gas diffusion chamber 76 is discharged downward in a dispersed manner via the plurality of fine holes 75. The gas discharged to a lower side of battery module 20 is discharged outside from between an upper face of fixing member 80 and the lower face of lower duct member 66 through two lower leg parts 78 at opposite end parts in length direction L. With this structure, similarly to the structure in FIGS. 1 to 3, it is possible to reduce a temperature of gas discharged outside module case 30 from battery cells 2. Other structures and operations are similar to those of the structure in FIGS. 1 to 3.

Lower leg parts 78 may be a plurality of (e.g., four) pillar-shaped lower leg parts connected to a lower face of lower duct member 66. Instead of connecting the lower leg parts to the lower face of lower duct member 66, hole parts for letting gas out may be formed in fixing member 80. In the structure in FIG. 7, gas intercepting member 58 may be provided in lower gas diffusion chamber 76 similarly to the structures in FIGS. 4 to 6. Additionally, when gas intercepting member 58 is provided in lower gas diffusion chamber 76, a gas intercepting wall part may be provided toward negative-side current collector 5 in height direction H to surround an outer periphery of gas intercepting member 58 (not shown) in addition to leg parts 62 or second plate parts 64. In this case, such a gas intercepting wall part is formed to have a shorter length in height direction H than a length in height direction H of leg parts 62 or second plate parts 64. Therefore, battery cell side space 51 and fine hole side space S2 communicate with each other through clearances or passages formed by adjacent leg parts 62 or adjacent second plate parts 64, the gas intercepting wall part, and negative lead plate 8. If the gas intercepting wall part is provided, gas intercepting member 58 serves as a pan when electrolyte solution leaks from battery cells 2, to prevent leakage of the electrolyte solution to an outside of battery module 20.

Figure 10:
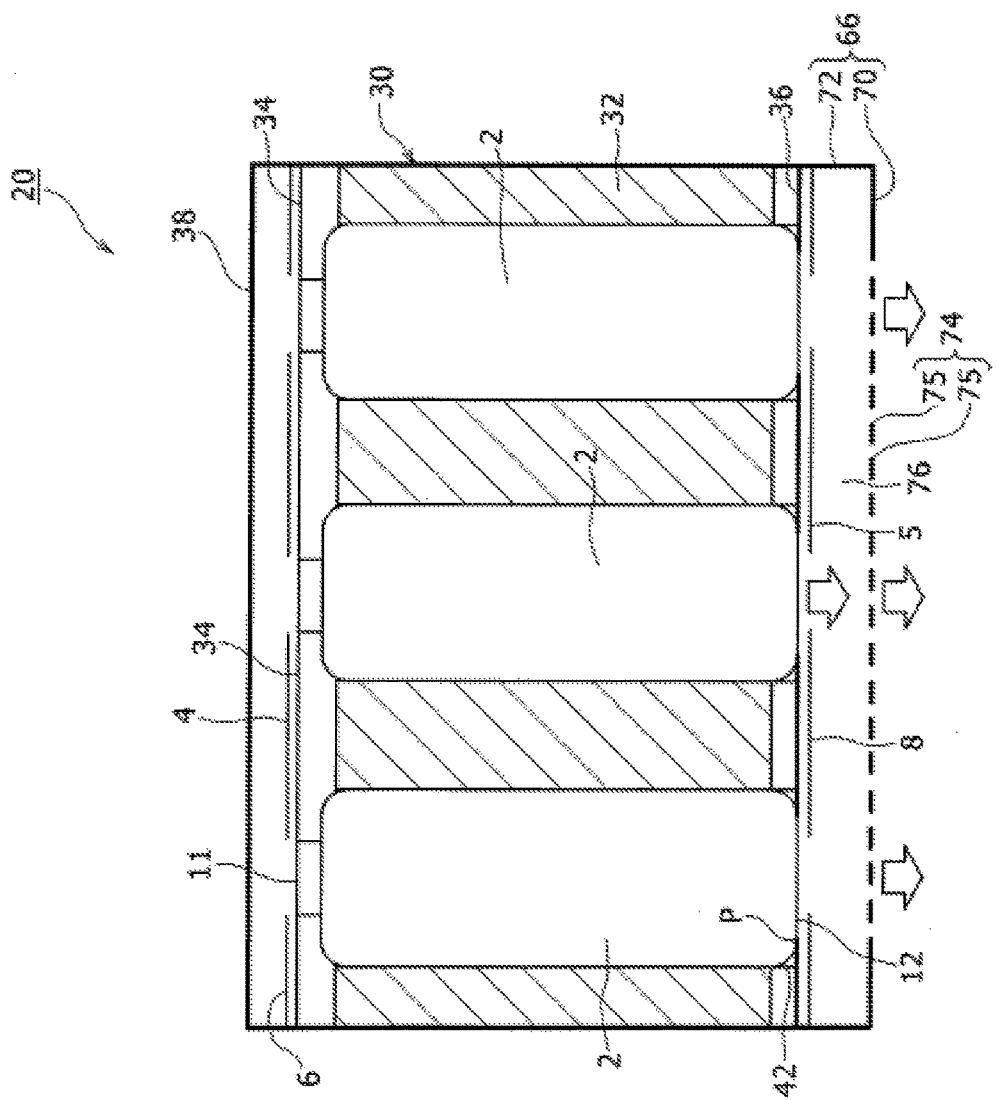
FIG. 10 is a diagram showing a third example of the variation of the battery module in the exemplary embodiment of the present disclosure and corresponding to FIG. 3.

FIG. 10 is a diagram showing a third example of the variation of battery module 20 in the exemplary embodiment and corresponding to FIG. 3. The section (a) of FIG. 11 is an enlarged view of one battery cell 2 and lower holder 36 in a structure in FIG. 10 and the section (b) of FIG. 11 is a bottom view of the section (a) of FIG. 11.

In the structure in this example, an upper end peripheral edge part of each of lower openings 44 provided to lower holder 36 comes in contact with a lower end outer peripheral edge part of battery cell 2 at only corner part P of battery cell 2 on the lower end face of battery cell 2. In this case, as compared with a case in FIG. 9, an area of a vertically overlap part between a lower end face of battery cell 2 and lower holder 36 (a diagonally hatched part in the section (b) of FIG. 11 is smaller, which allows increase in diameters of engraved part 14 and thin-walled part of battery cell 2. In this way, it is possible to enhance gas discharge performance from a negative side of battery cell 2. Other structures and operations are similar to those of the structure in FIGS. 7 to 9.

FIG. 12 is a view showing a variation of lower holder 36; the section (a) of FIG. 12 is a diagram corresponding to the section (a) of FIG. 11 and the section (b) of FIG. 12 is a bottom view of the section (a) of FIG. 12. In a structure in this variation, protrusions 82 protruding toward a radially inner side of lower opening 44 of lower holder 36 are formed at a plurality of (e.g., four) positions in a radial direction of an inner peripheral face of lower opening 44. Each of protrusions 82 is in contact with a lower end outer peripheral edge part of battery cell 2 at only corner part P of battery cell 2.

With the above-described structure, it is possible to enhance gas discharge performance from a negative side of battery cell 2 as compared with the structure in FIGS. 10 to 11. Other structures and operations are similar to those of the structure in FIGS. 10 to 11.

In each of the examples and the variation in FIGS. 7 to 12, it is preferable to restrict the area ratio of the diagonally hatched part in each of FIGS. 9, 11, and 12 which is the area of the vertical overlap part between the peripheral edge part of lower opening 44 of lower holder 36 and the lower end part of battery cell 2 with respect to a projected area of the lower end part of battery cell 2 in a case where the lower end part is seen vertically into a range from 10% to 35% inclusive. The projected area of the lower end part of battery cell 2 when the lower end part is seen in the up-down direction is an inner area of an outer peripheral circle of a circular cylindrical outer peripheral face of battery cell 2 when battery cell 2 is in a circular cylindrical shape.

If a percentage of each of the areas is restricted into this range, the gas discharge performance from the negative side of battery cell 2 is further remarkably enhanced and it is possible to increase strength of lower holder 36 for holding battery cell 2.

Figure 13:
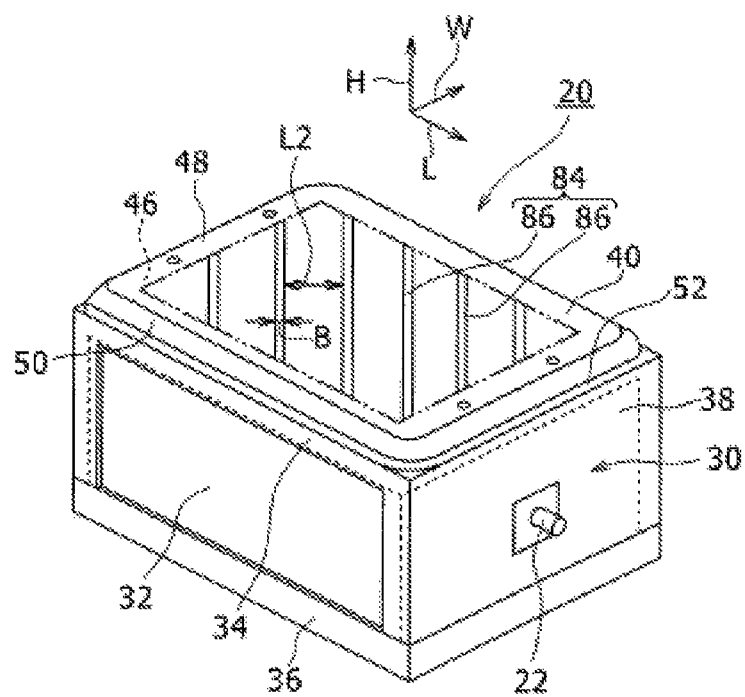
FIG. 13 is a perspective view of a fourth example of the variation of the battery module in the exemplary embodiment of the present disclosure.

FIG. 13 is a perspective view of a fourth example of the variation of battery module 20 in the exemplary embodiment. In battery module 20 in this example, through-hole dispersed part 84 is provided to plate part 48 of duct member 40. Through-hole dispersed part 84 includes a plurality of straight slits 86 which are through-holes formed at a plurality of positions of plate part 48 to vertically pass through plate part 48. Respective slits 86 are arranged parallel to each other while inclined with respect to length direction L and width direction W of plate part 48. Respective slits 86 are preferably arranged at equal intervals in plate part 48. A plurality of slits 86 may be arranged parallel to each other at intervals along length direction L or width direction W of plate part 48.

If voltage of one battery cell 2 is 4.2 V, a total area of respective opening areas of the plurality of slits 86 facing the outer space is preferably 160 mm$^2$ or larger. By restricting the total area of the respective opening areas in this manner, it is possible to remarkably suppress increase in pressure in gas diffusion chamber 46. Moreover, width B of each of slits 86 is preferably 1.0 mm or smaller and interval L2 of adjacent slits 86 is preferably 5 mm or longer. By restricting width B and interval L2 in this manner, it is possible to obtain a remarkable effect on suppression of a temperature of the gas ejected from battery cells 2 and discharged via slits 86.

With the above-described structure, similarly to the structure in FIGS.

1 to 3, it is possible to reduce the temperature of the gas discharged outside module case 30 from battery cells 2. Other structures and operations are similar to those of the structure in FIGS. 1 to 3.

Figure 14:
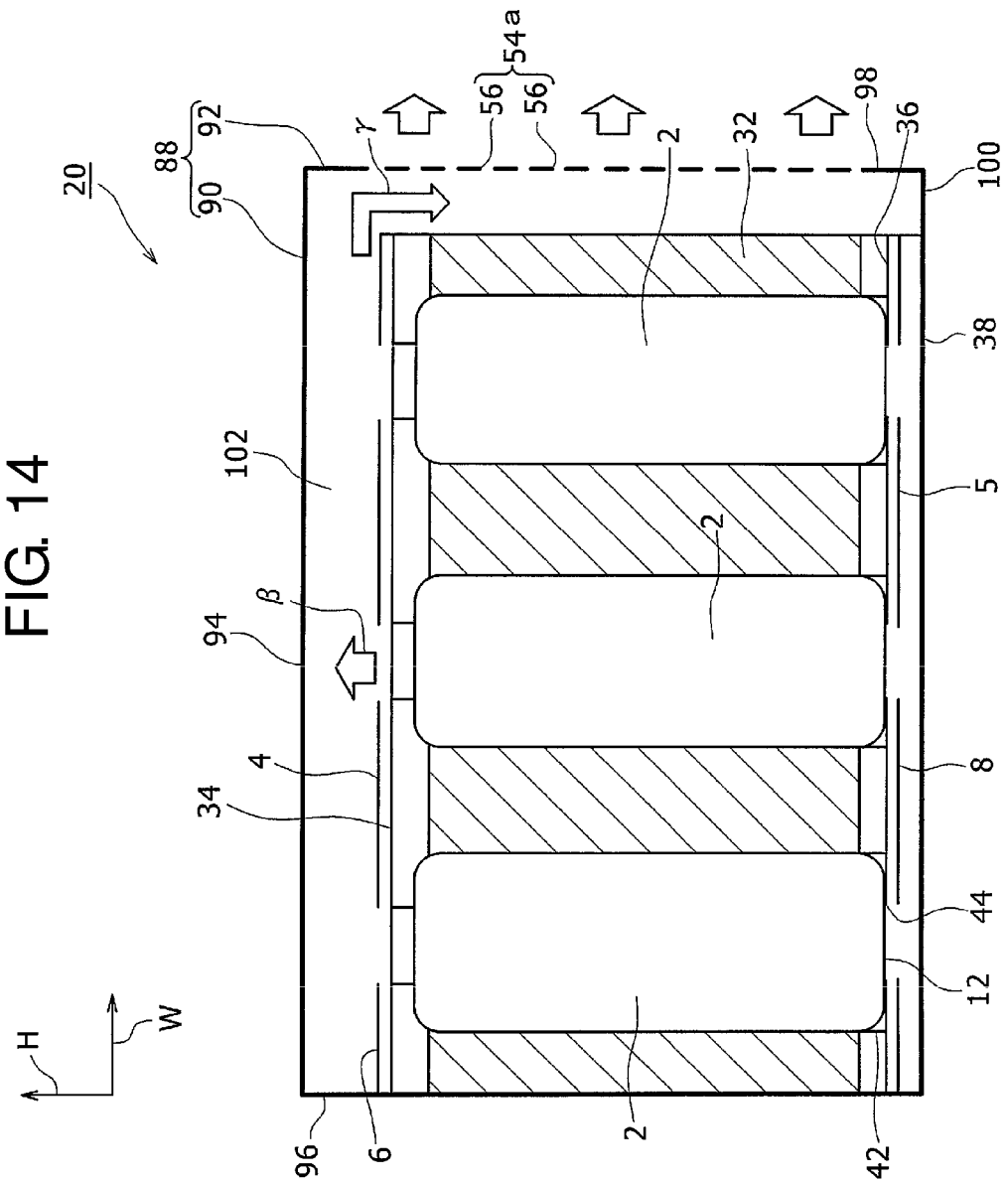
FIG. 14 is a diagram showing a fifth example of the variation of the battery module in the exemplary embodiment of the present disclosure and corresponding to FIG. 3.

FIG. 14 is a diagram showing a fifth example of the variation of battery module 20 in the exemplary embodiment and corresponding to FIG. 3. In battery module 20 in this example, duct member 88 is formed to have an L-shaped section in the structure in FIGS. 1 to 3. To put it concretely, duct member 88 includes upper element 90 provided to an upper end part and lower element 92 connected to one side end part (a right end part in FIG. 14) in width direction W of upper element 90 to extend downward. Upper element 90 includes upper plate part 94 and upper peripheral wall part 96 provided to a lower of a part of an outer peripheral part of upper plate part 94 excluding a part connected to lower element 92. Lower element 92 includes lower plate part 98 perpendicularly connected to upper plate part 94 and lower peripheral wall part 100 provided on a side of battery cells 2 to a part of an outer peripheral part of lower plate part 98 excluding a part connected to upper element 90. Gas diffusion chamber 102 is provided inside upper element 90 and lower element 92.

Upper element 90 is provided to cover an upper side of upper holder 34 and fixed to an upper side of an upper end opening peripheral edge part, which is in a frame shape, of cover member 38. Lower element 92 is provided to cover an outer side of one side end part in width direction W of battery module 20 and fixed to upper holder 34 and lower holder 36 to extend downward. Lower plate part 98 is a side wall part forming an outer face of one side end part in width direction W of battery module 20. Lower element 92 is mounted to cover substantially an entire part of one side end face in width direction W of battery module 20 excluding duct member 88.

A through-hole dispersed part is not formed in upper plate part 94 and second lower through-hole dispersed part 54a including fine holes 56 which are a plurality of through-holes is formed in lower plate part 98 instead. Second lower through-hole dispersed part 54a is similar to through-hole dispersed part 54 provided to plate part 48 in the structure in FIGS. 1 to 3.

According to the above-described structure, the high-temperature gas ejected in a direction of arrow β from a positive side of at least one battery cell 2 flows through gas diffusion chamber 102 while diffused from an upper element part to a lower element part. The gas is discharged outside battery module 20 in a dispersed manner via the plurality of fine holes 56. With the above-described structure, it is possible to reduce a temperature of the gas discharged outside module case 30 from battery cells 2. Other structures and operations are similar to those of the structure in FIGS. 1 to 3. In the structure of this example, second lower through-hole dispersed part 54a may be formed by a plurality of slits.

Although the exemplary embodiment of the present invention has been described above, the present invention is not limited to the exemplary embodiment and it is needless to say that the present invention can be carried out in various embodiments without departing from the gist of the present invention. For example, a battery module may include a circuit board having a function of controlling output from or input to battery cells 2 and the like. Moreover, the case forming the battery module is not limited to the structure in each of the above-described examples. For example, a case may be formed by connecting a duct member having a plurality of through-holes to an upper part or a lower part of a box-shaped case main body which is open at one end in an up-down direction.

Although respective battery cells 2 are disposed with all of the positive electrodes positioned on the upper side and all of the negative electrodes positioned on the lower side in each of the above-described examples, respective battery cells 2 may be disposed in a housing case with all of positive electrodes positioned on a lower side and all of negative electrodes positioned on an upper side. Although the battery module has a function of discharging the gas from the positive sides or the negative sides of respective battery cells 2, the battery module may be formed to discharge gas respectively from positive and negative sides via a plurality of through-holes.

The invention claimed is:

1. A battery module comprising:
a plurality of battery cells; and
a case for housing the plurality of battery cells, wherein:
the case has a plurality of through-holes which are provided in a wall part forming an outer face of the battery module and via which gas ejected from at least one of the plurality of battery cells is discharged in a dispersed manner,
the plurality of through-holes are a plurality of fine holes or slits,
the fine holes each have a circular shape having a diameter of 2 mm or smaller, or have an oval or rectangular shape having the same size as the circular shape, or the slits each have a width 1.0 mm or smaller,
an interval between adjacent fine holes or slits is 5 mm or longer,
the interval is smaller than an interval of adjacent battery cells among the plurality of battery cells,
the battery module further comprises a gas diffusion chamber which is provided on an inner side of the wall part, which communicates with an outer space through the through-holes, and in which the gas ejected from at least one of the battery cells is diffused,
the plurality of battery cells are disposed in the case with all of positive sides positioned on one side and all of negative sides positioned on the other side,
the gas diffusion chamber is provided between the battery cells and the through-holes,
the battery module further comprises a lower holder by which lower end parts of the battery cells are supported and in which lower openings are formed at portions facing lower ends of the battery cells,
the wall part is provided to a lower end of the case, and
in a vertical view of the lower end part, the lower holder vertically overlaps between 10% and 35%, inclusive, of a projected area of the lower end part of each of the battery cells.

2. The battery module according to claim 1, further comprising a gas intercepting plate provided between the plurality of battery cells and the plurality of through-holes in the gas diffusion chamber to partition the gas diffusion chamber into a battery cell side space and a through-hole side space,
wherein the battery cell side space and the through-hole side space communicate with each other near an outer periphery of the gas intercepting plate.

3. The battery module according to claim 1, wherein
a peripheral edge part of each of the lower openings of the lower holder comes in contact with an outer peripheral edge part of the lower end of each of the battery cells.

4. The battery module according to claim 1,
wherein the plurality of through-holes cause an adiabatic expansion effect which is exerted when the gas passes through the plurality of through-holes, and cools the gas.

* * * * *